United States Patent
Shimada

(10) Patent No.: US 6,944,314 B2
(45) Date of Patent: Sep. 13, 2005

(54) DIGITAL INFORMATION EMBEDDING DEVICE EMBEDDING DIGITAL WATERMARK INFORMATION IN EXACT DIGITAL CONTENT, COMPUTER-READABLE RECORDING MEDIUM HAVING DIGITAL INFORMATION EMBEDDING PROGRAM RECORDED THEREIN, AND METHOD OF EMBEDDING DIGITAL INFORMATION

(75) Inventor: Mitsunobu Shimada, Takaichi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 795 days.

(21) Appl. No.: 09/875,140

(22) Filed: Jun. 7, 2001

(65) Prior Publication Data

US 2001/0054145 A1 Dec. 20, 2001

(30) Foreign Application Priority Data

Jun. 16, 2000 (JP) .................................. 2000-181049

(51) Int. Cl.$^7$ .............................................. G06K 9/00
(52) U.S. Cl. .................. 382/100; 382/250; 375/240.01
(58) Field of Search ................................ 348/269, 129, 348/131; 380/51, 54, 201; 382/100, 112, 154, 162, 165, 166, 168, 169–172, 189, 191, 194, 221, 233–253, 260, 263, 274, 276, 277, 280, 299, 305; 375/240.01, 240.02; 250/226, 341.1; 358/463, 475

(56) References Cited

U.S. PATENT DOCUMENTS

| | | | | | |
|---|---|---|---|---|---|
| 6,584,210 | B1 | * | 6/2003 | Taguchi et al. | 382/100 |
| 6,668,068 | B2 | * | 12/2003 | Hashimoto | 382/100 |
| 6,687,383 | B1 | * | 2/2004 | Kanevsky et al. | 382/100 |
| 6,697,497 | B1 | * | 2/2004 | Jensen et al. | 382/100 |
| 6,711,276 | B1 | * | 3/2004 | Yoshiura et al. | 382/100 |
| 6,757,405 | B1 | * | 6/2004 | Muratani et al. | 382/100 |

FOREIGN PATENT DOCUMENTS

JP   11-284836   10/1999

OTHER PUBLICATIONS

"Watermark Information: a crack to prevent copying and improper use of products in copyright" Nikkei Electronics No. 683, Feb. 1997, pp. 100–107.

* cited by examiner

*Primary Examiner*—Bhavesh M. Mehta
*Assistant Examiner*—Seyed Azarian
(74) *Attorney, Agent, or Firm*—Nixon & Vanderhye P.C.

(57) ABSTRACT

To dynamically embed information with a digital content taken into account a digital information embedding device includes an input block receiving an image, a feature value parsing block detecting a feature value of at least a partial area of the input image, and an information embedding block modifying the area, based on the detected feature value. A feature value detected can be referred to to modify an area. This allows a content of an image to be considered in embedding digital information.

18 Claims, 12 Drawing Sheets

FIG.4
PIXEL VALUE AREA
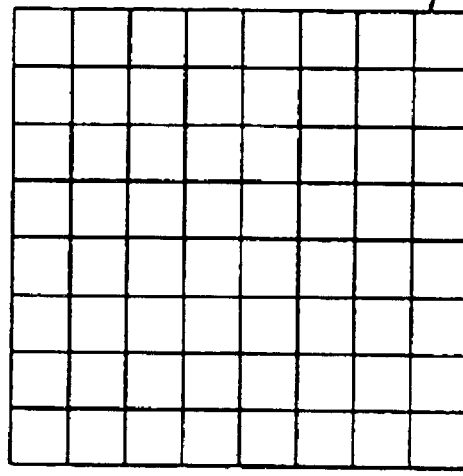
DCT
FREQUENCY AREA
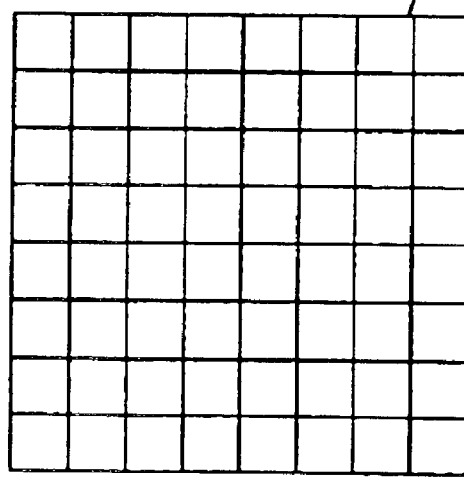

FIG.9A PRIOR ART
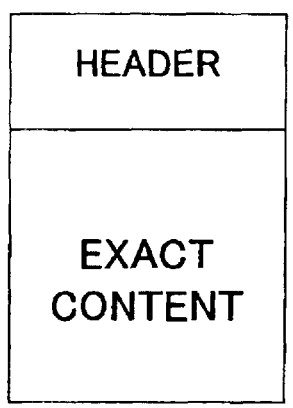
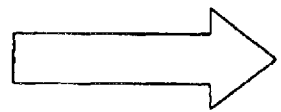
FIG.9B PRIOR ART
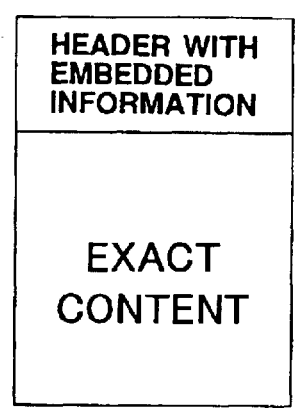
EMBED COPYRIGHT INFORMATION
INTO HEADER

FIG.10A *PRIOR ART*       FIG.10B *PRIOR ART*
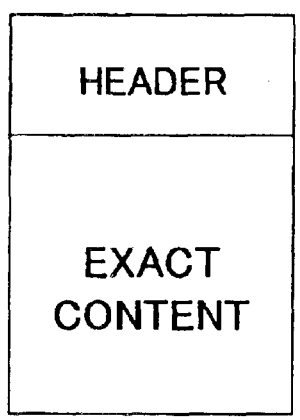 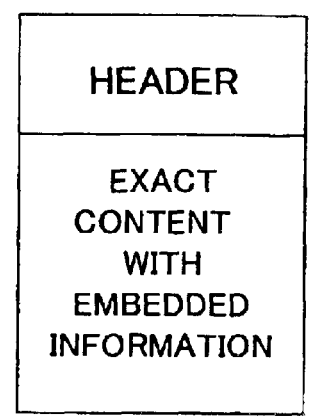
EMBED COPYRIGHT INFORMATION
INTO EXACT CONTENT

EMBEDDING TOO MUCH
NOISE MAKES ...

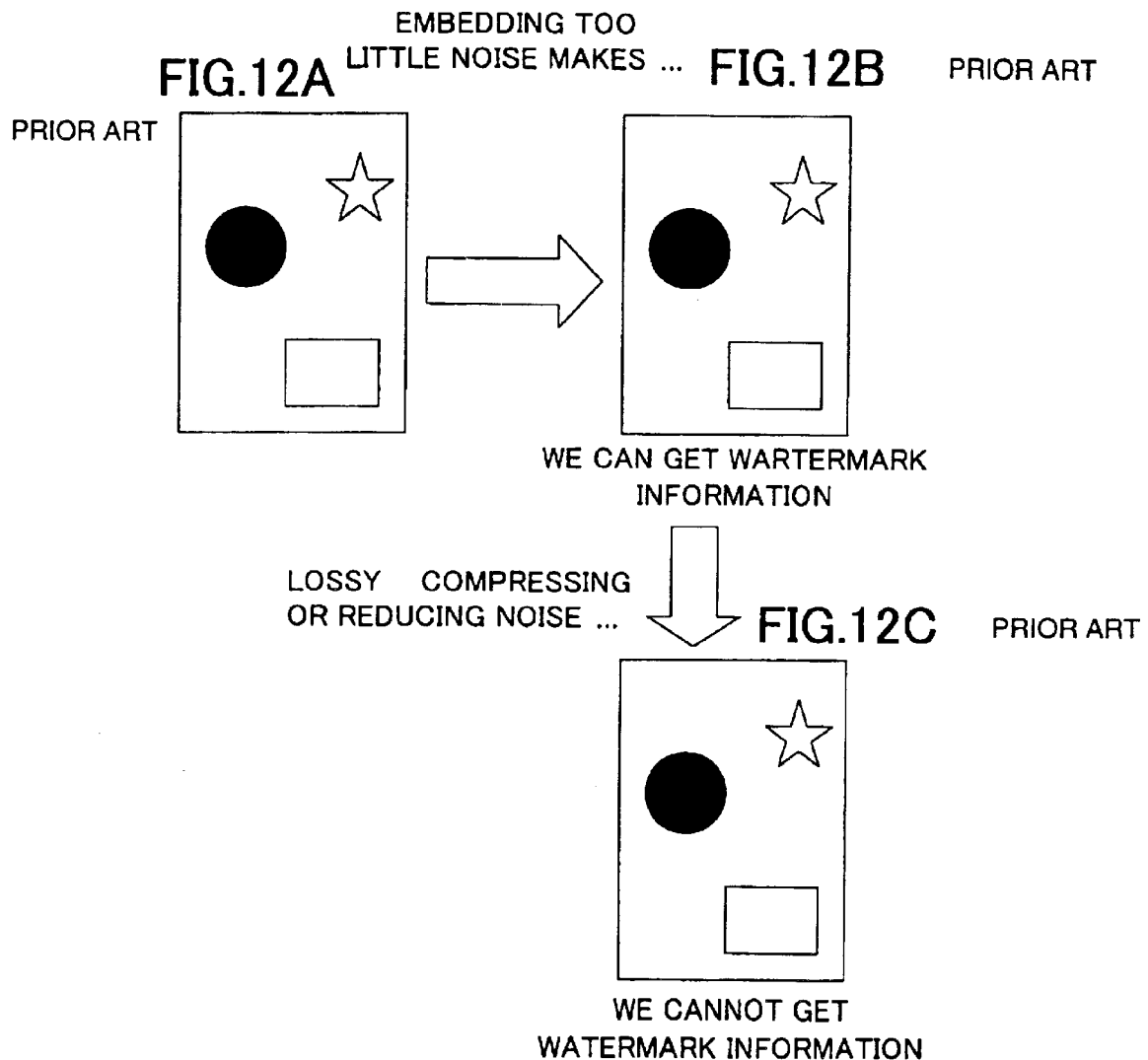

DIGITAL INFORMATION EMBEDDING DEVICE EMBEDDING DIGITAL WATERMARK INFORMATION IN EXACT DIGITAL CONTENT, COMPUTER-READABLE RECORDING MEDIUM HAVING DIGITAL INFORMATION EMBEDDING PROGRAM RECORDED THEREIN, AND METHOD OF EMBEDDING DIGITAL INFORMATION

BACKGROUND OF THE INVENTION

1. Field of the Invention

The present invention relates generally to digital information embedding devices and computer-readable recording media having a digital information embedding program recorded therein, and particularly to those capable of embedding digital watermark information for example of copyright information and user information in an exact digital content.

2. Description of the Background Art

As computer technology has been advanced, video, audio and other various information are more frequently digitized and thus used on computers. A digitized content does not degrade if it is copied. As such it is crucial to protect the copyright of the content. One method of protecting a copyright that is currently used is to add copyright information to a header of a content and read the information when the contents is used. FIGS. 9A and 9B schematically show an image having a content with a header having copyright information added thereto. With reference to FIG. 9A, the content includes an exact content such as an image and a header. With reference to FIG. 9B, the header has copyright information added thereto. This method is disadvantageous, however, since the copyright information is lost when the content is converted in a different format, an analog manner, or the like.

FIGS. 10A and 10B schematically show a method modifying an exact content to embed information. With reference to FIG. 10A, a content includes an exact content such as an image and a header. With reference to FIG. 10B, the exact content is modified to embed information in the exact content. This digital watermark technique has in recent years been attracting attention.

The digital watermark technique will now be briefly described. As described in Nikkei Electronics, No. 683, pp.100–107, a digital content, including audio and video data, has a portion which is not important to human senses, i.e., a redundant portion. In the technique such a redundant portion is noted and information such as copyright is embedded on a content in the form of noise. The embedded information is detected via characteristics of the method used to embed the information.

Digital watermark information is a noise on a content if the meaning carried by the information is not considered. As such, embedding information inevitably degrades the exact content. FIGS. 11A and 11B schematically show an image representing a content before it has information embedded therein, and an image representing the content after it has embedded therein information too much relative to the content, respectively. If information to be embedded in a content is large in amount relative to the content, a human sense can perceive degradation of the content in the form of noise, which is not desirable for digital watermark.

In contrast, if information too small relative to a content is embedded in the content, watermark information would readily be removed. FIGS. 12A and 12B schematically show an image representing a content before it has information embedded therein, and an image representing the content after it has embedded therein information too small relative to the content, respectively, and FIG. 12C shows the content after it is for example compressed or has noise removed. With the content having a small noise embedded and thus added thereto, if the content with information embedded therein as show in FIG. 12B is for example compressed or has noise removed, watermark information would be removed. As such, watermark information could not be detected in the content shown in FIG. 12C. This problem also similarly occurs if noise is added in a range limited to a redundant portion of a content.

Thus digital watermark information is required to be embedded with a level of degradation imperceptible through human senses and it is also required to be hardly removable. Accordingly, determining an appropriate degree of noise or information to be embedded in a content relative to the content, i.e., determining an appropriate degree to be applied to change the value of the content, is crucial in successfully embedding digital watermark information. Furthermore the degree of the information to be embedded in the content needs to be determined to accommodate the content receiving digital watermark information. Otherwise, the content, when it has digital watermark information embedded therein, would be significantly degraded or have the watermark information readily removed.

Thus a content needs to have a different degree of information embedded therein. In general, however, even a single content has therein portions having different properties. As such, if information is embedded in a content at a degree changed uniformly across the content, the content would on one hand have a portion allowing a variation to be readily perceived and on the other hand have a potion allowing a variation to be hardly recognized as watermark information. Accordingly, rather than it has a uniformly changed degree of information embedded therein, even a single content needs to have different degrees of information embedded therein for different portions thereof, such that if a portion of the content allows a variation to be readily perceived then it would have a small degree of information embedded therein whereas if a portion of the content hardly allows a variation to be readily perceived then it would have a large degree of information embedded therein.

One such method is disclosed in Japanese Patent Laying-Open No. 11-284836. This method uses a medical filter to determine a degree of information to be embedded. The method provides noise removal and in addition thereto high-precision edge enhancement to determine a feature value variation range perceptible through human senses.

In the above method, however, a content is subjected to noise removal and edge enhancement successively and thereafter has digital watermark information embedded therein. This inevitably involves a complicated process, requiring a negligibly long period of time to embed digital watermark information. Thus this method is not suitable for embedding information in a content dynamically when the content is displayed and reproduced.

SUMMARY OF THE INVENTION

The present invention has been made to overcome the disadvantage as described above.

One object of the present invention is to provide a digital information embedding device, recording medium having a digital information embedding program recorded therein and digital information embedding method capable of embedding information dynamically with digital contents taken into account.

Another object of the present invention is to provide a digital information embedding device, recording medium having a digital information embedding program recorded therein and digital information embedding method capable of rapidly embedding information in a digital content.

To achieve the above objects the present invention in one aspect provides an digital information embedding device including: an input block receiving a digital content input; a feature value detection block detecting a feature value of at least a partial area of the digital content input; and an information embedding block modifying the area, based on the feature value detected.

In accordance with the present invention a feature value is detected in an input digital content at at least a partial area and referred to to allow an area to vary. Thus depending on the digital content a portion to vary changes. Consequently the digital information embedding device can embed information dynamically with the digital content considered.

Preferably in the digital information embedding device the input block receives an image and the feature value detection block detects as the feature value a value indicating a level allowing a human visual sense to perceive a pixel value vary.

In accordance with the present invention an image is received and a feature value is detected in the form of a value indicating a level allowing a human visual sense to perceive a pixel value vary. As such, the level allowing a human visual sense to perceive a pixel value vary, can be referred to to determine an amount and location of information to be embedded.

Preferably in the digital information embedding device the information embedding block changes a value of a pixel in the area only when the feature value detected has a value preventing the human visual sense from perceiving the pixel value vary.

In accordance with the present invention a pixel in the area has its value changed only when the feature value detected is a value preventing the human visual sense from perceiving the pixel value vary. Thus an image can be free from image quality degradation.

Preferably in the digital information embedding device the information embedding block includes a range determination block setting a larger variation range for the pixel value if the feature value detected has a higher level allowing the human visual sense to perceive the pixel value vary, and the information embedding block changes a value of the pixel in the area within the variation range determined.

In accordance with the present invention the pixel value has a variation range set larger if the feature value detected has a higher level allowing the human visual sense to perceive the pixel value vary. As such, more information can be embedded in a portion having the higher level allowing the human visual sense to perceive the pixel value vary.

Preferably in the digital information embedding device the information embedding block includes a range determination block determining a variation range for the pixel value, based on the feature value detected, and the information embedding block changes a value of the pixel in the area within the variation ranged determined.

In accordance with the present invention the feature value detected is referred to to determine a variation range for the pixel value. As such, different portions can have different amounts of information embedded therein.

Preferably in the digital information embedding device the feature value detection block includes a transform block orthogonally transforming a value of a pixel in the area to detect as the feature value at least one high frequency component of a frequency component orthogonally transformed.

In accordance with the present invention the feature value is detected in the form of at least one high frequency component of a frequency component resulting from orthogonally transforming the value of a pixel included in the area. As such, the feature value can accommodate a variation in value of a pixel of an image and the digital information embedding device can thus embed information rapidly.

Preferably in the digital information embedding device the input block receives an image, the feature value detection block detects as a feature value a value in brightness of a pixel included in the area, and the information embedding block includes a range determination block setting a larger variation range for a pixel value if the value in brightness detected is smaller and the information embedding block changes a value in brightness of the pixel in the area within the variation range determined.

In accordance with the present invention a feature value is detected in the form of a value in brightness of a pixel included in the area and a pixel value has a variation range set larger if the value in brightness detected is a smaller value. As such the fact can be enjoyed that a pixel having a small value in brightness prevents a human sense from perceiving an image vary. There can also be provided a digital information embedding device capable of rapidly embedding information.

The present invention in another aspect provides a computer-readable recording medium having recorded therein a program provided to embed digital information and causing a computer to perform the steps of: receiving a digital content input; detecting a feature value of at least a partial area of the digital content input; and modifying the area, based on the feature value detected.

In accordance with the present invention a feature value is detected in an input digital content at at least a partial area and referred to to allow an area to vary. Thus depending on the digital content a portion to vary changes. Consequently the digital information embedding program can embed information dynamically with the digital content considered.

The present invention in still another aspect provides a method of embedding digital information, comprising the steps of: receiving a digital content input; detecting a feature value of at least a partial area of the digital content input; and modifying the area, based on the feature value detected.

In accordance with the present invention a feature value is detected in an input digital content at at least a partial area and referred to to allow an area to vary. Thus depending on the digital content a portion to vary changes. Consequently the digital information embedding method can embed information dynamically with the digital content considered.

The foregoing and other objects, features, aspects and advantages of the present invention will become more apparent from the following detailed description of the present invention when taken in conjunction with the accompanying drawings.

BRIEF DESCRIPTION OF THE DRAWINGS

In the drawings:

FIG. 4 shows a relationship between 8×8 pixel value component and a DCT block;

FIGS. 9A and 9B schematically show an image having a content with a header having copyright information added thereto;

FIGS. 10A and 10B schematically show a method changing an exact content to embed information;

FIGS. 12A–12C schematically show an image representing a content before it has information embedded therein, and an image representing the content after it has embedded therein information too small relative to the content, respectively.

DESCRIPTION OF THE PREFERRED EMBODIMENTS

Figure 1:
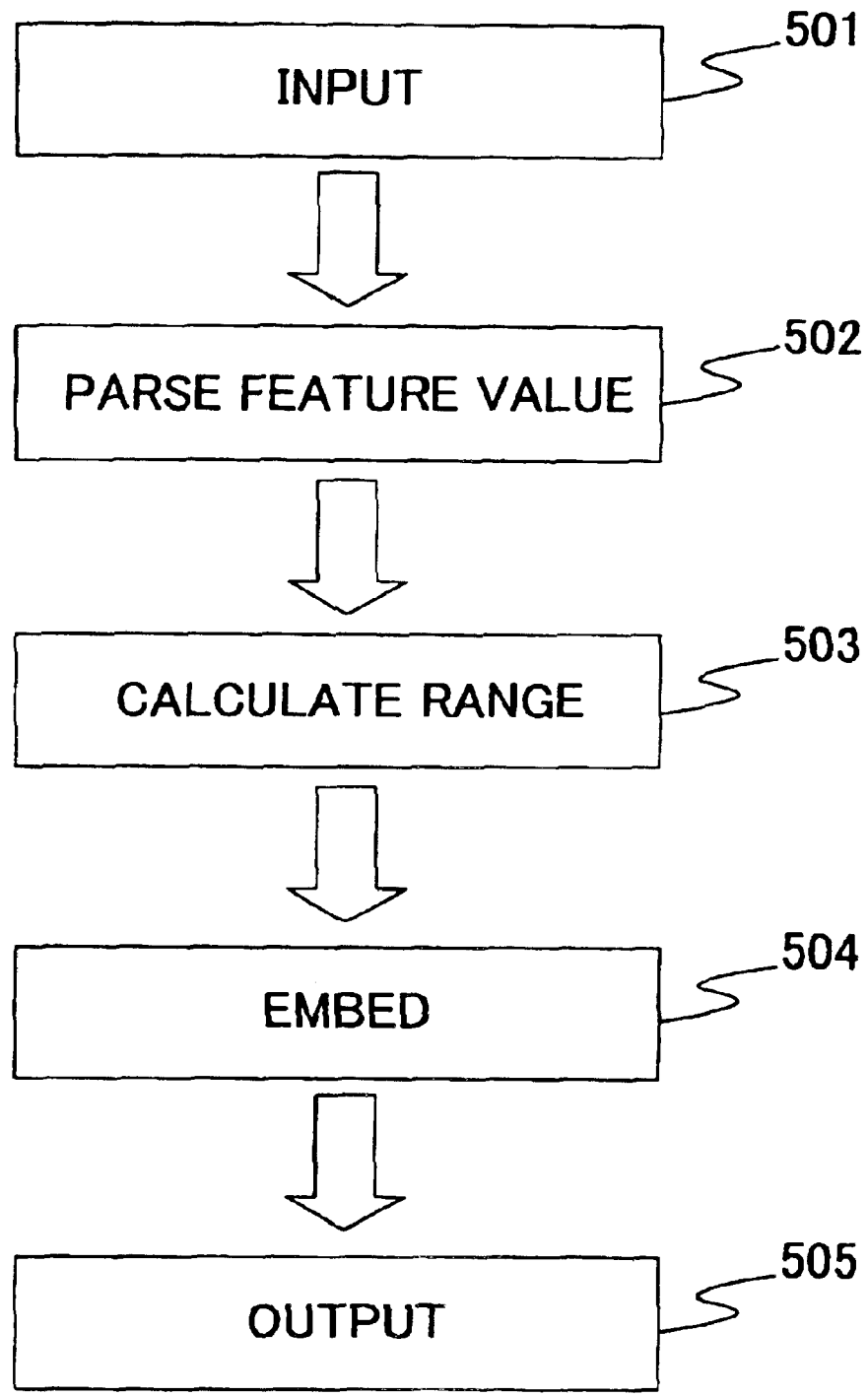
FIG. 1 is a block diagram generally showing a configuration of a digital information embedding device in a first embodiment of the present invention.

The embodiments of the present invention will now be described with reference to the drawings. In the figures, like reference characters denote like components.

First Embodiment

With reference to FIG. 1, a digital information embedding device 500 includes an input block 501 for externally receiving an image, a feature value parsing block 502 detecting a partial feature value of the image input via input block 501, a range calculation block using the detected feature value to calculate a range allowing a value of a content to vary therein, an information embedding block 504 referring to the calculated range to embed information, and an output block 505 outputting an image with information embedded therein. Note that herein the digital content is an image, which includes both still and ammoniated images. The digital content may also be audio data.

Figure 2:
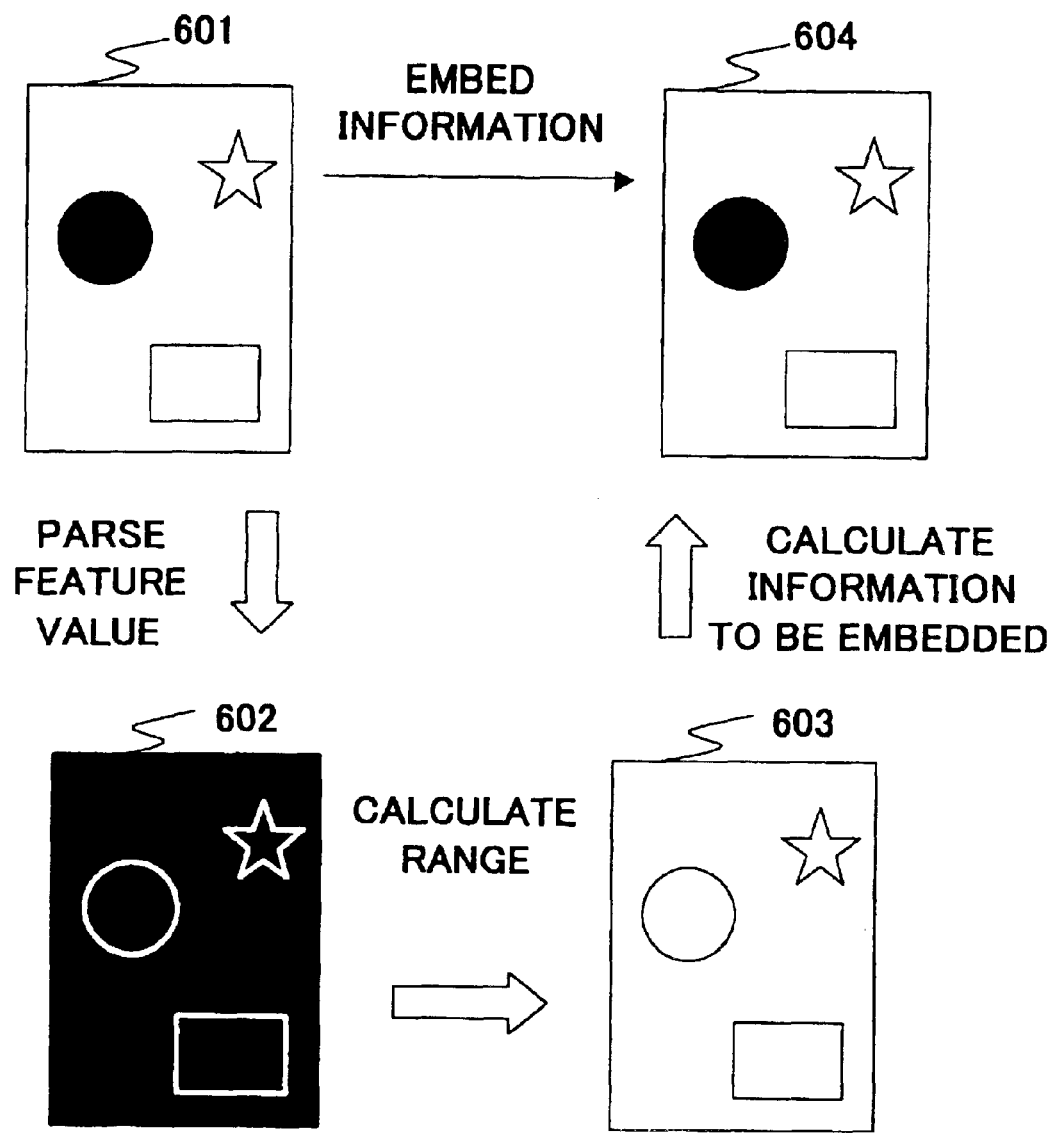
FIG. 2 schematically shows an image processed by the digital information embedding device of the first embodiment.

FIG. 2 schematically shows an image processed by digital information embedding device 500 of the first embodiment. With reference to FIGS. 1 and 2, an image 601 corresponding to a digital content is received via input block 501 and stored in a buffer memory. Image 601 may also include still images, animated images, audio data, and any other information that are contents having a redundant portion allowing digital watermark information to be embedded therein.

Feature value parsing block 502 parses a feature value 602 of image 601 stored in the buffer memory. The feature value is a value indicating a degree allowing a human sense to perceive image 601 having a value changed. It can for example be an image's brightness value, differentiation result, finite difference result, and the like. It is obtained for a plurality of portions of image 601.

Range calculation block 503 uses feature value 602 to determine a range 603 allowing a value of a content to vary therein. Variation range 603 is set to be large for a portion hardly allowing a variation to be perceived and it is set to be small or zero for a portion readily allowing a variation to be perceived. The range may have a maximal value determined in any manner that uses a feature value calculated by feature value parsing block 502. For example the range may vary with a threshold or it may vary according to a simple function to be in proportion with a feature value.

Information embedding block 504 changes a value of digital content 601 within variation range 603 to produce a content with a watermark embedded therein 604. The watermark is embedded by a known technique and will thus not be described herein. A component for the embedment may be a frequency component in Fourier transform, discrete cosine transform (DCT), Wavelet transform or the like or it may be an exact sample value such as a bit plane in an image brightness value.

Output block 505 outputs content 604 to a display or a printer.

In the first embodiment digital information embedding device 500 uses a digital content provided in the form of a still image and feature value parsing block 502 applies DCT to the still image for each unit block consisting of eight horizontally arranged pixels multiplied by eight vertically arranged pixels.

Furthermore variation calculation block 503 is adapted to calculate a variation range from a value of a high frequency component of an alternating current (ac) component of a DCT block and information embedding block 504 is adapted to change a value of a low frequency component of an ac component of a DCT block.

Figure 3:
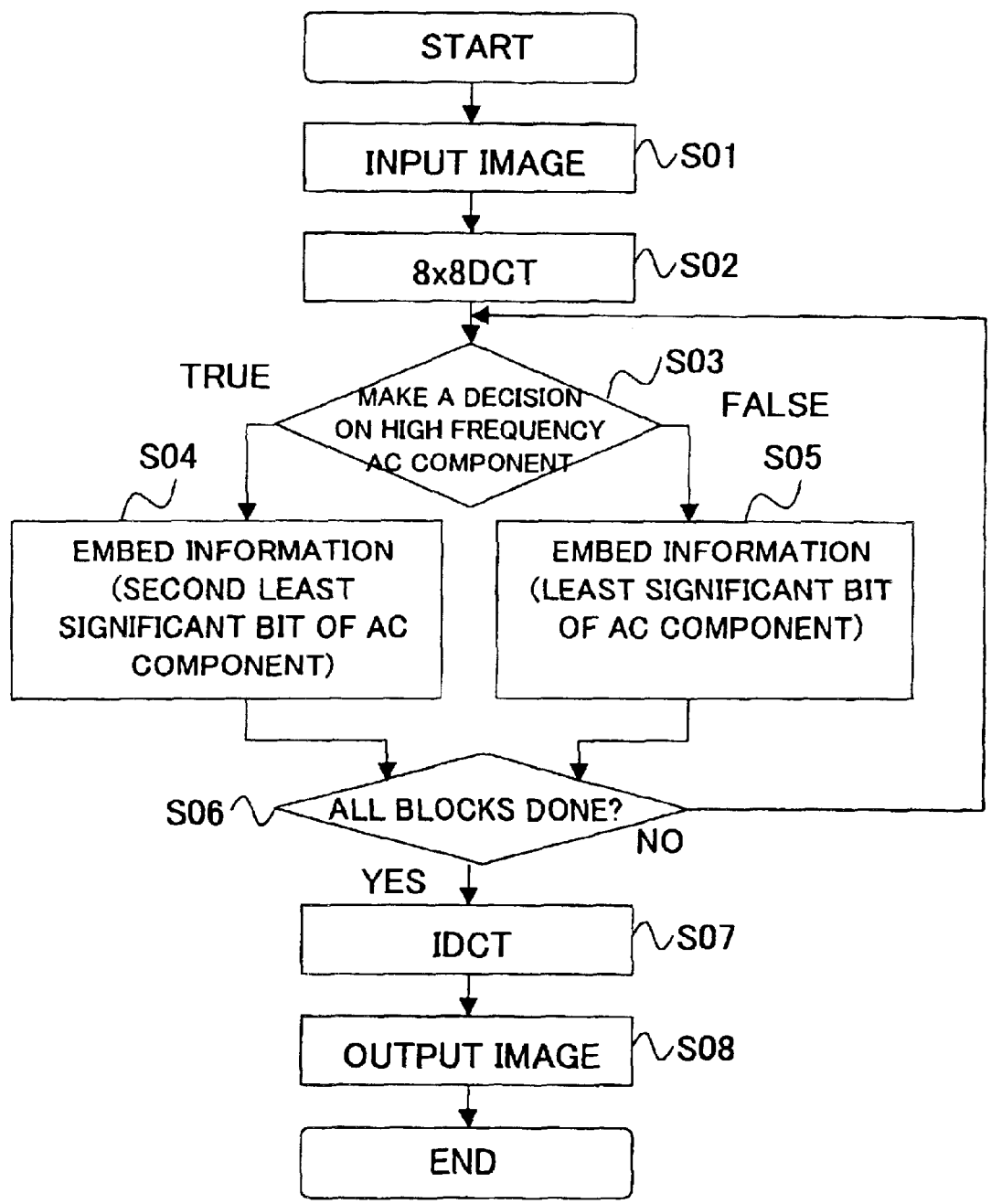
FIG. 3 is a flow chart of a process provided by the digital information embedding device of the first embodiment.

FIG. 3 is a flow chart of a process provided by digital information embedding device 500 of the first embodiment. With reference to FIG. 3, an image to have watermark information embedded therein is initially read in via input block 501 (step 501).

Feature value parsing block 502 then calculates a DCT for each unit block of eight blocks by eight blocks to transform the image to a frequency component and a high frequency component value is thus obtained as a feature value (step S02).

FIG. 4 shows a relationship between an 8×8 pixel value component 801 and a DCT block 802. In the present embodiment, a block of eight pixels by eight pixels is DCTed. In the DCT, pixel value component 801 in the block is orthogonally transformed to frequency component 802.

Figure 5:
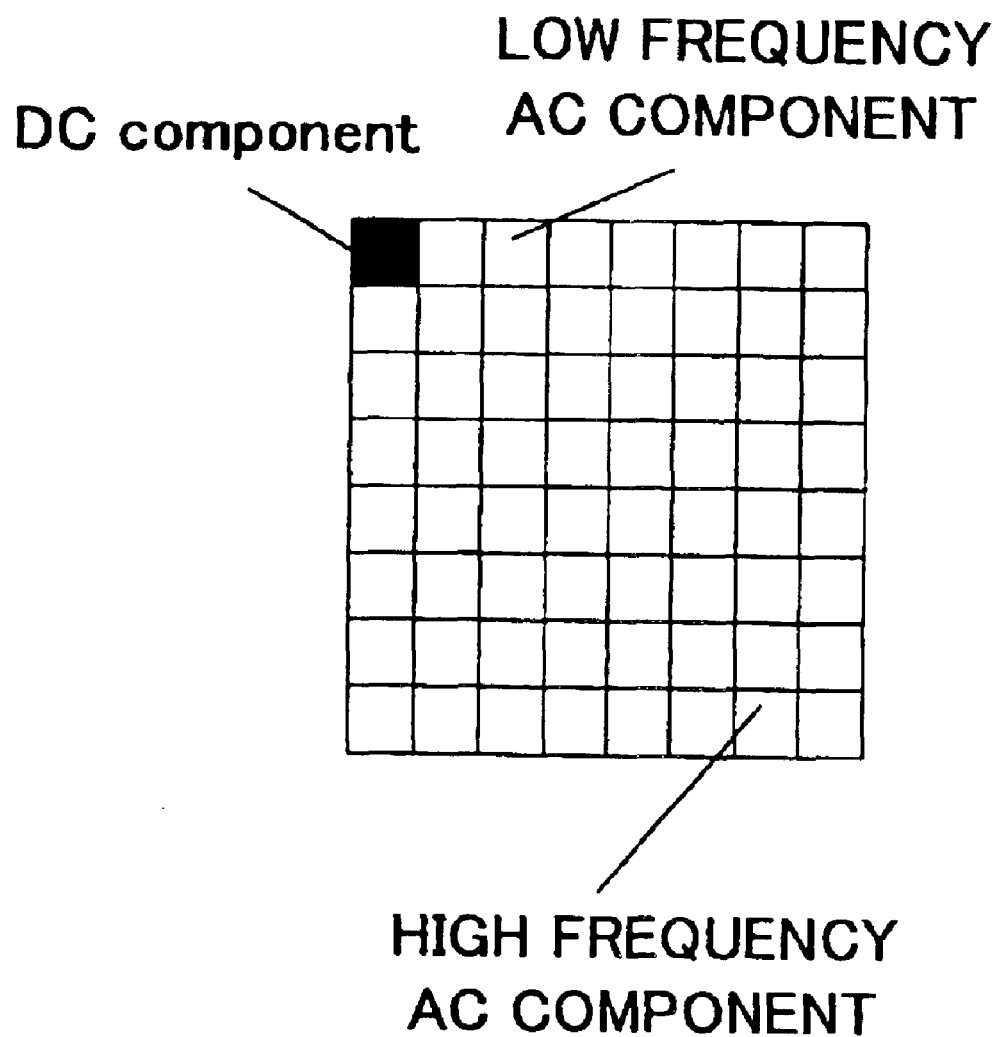
FIG. 5 is a diagram for illustrating a frequency component.

FIG. 5 is a diagram for illustrating frequency component 802. Frequency component 802 has 64 components of (0, 0) to (7, 7). Of the components, component (0, 0) is not information related to frequency and it is referred to as a direct current (dc) component. The other components are ac components. Herein an ac component is sorted based on whether it has a high frequency or a low frequency. Herein a high-frequency ac component is adopted as a feature value. Discrete cosine transform is a known technique used for example in JPEG compression and it will not be further described herein.

Again with reference to FIG. 3, at the subsequent step S03, for each block a decision is made on a high frequency component. The decision can be made in various manners. For example, if any of high frequency components (4, 4) to (7, 7) exceeds a predetermined threshold value then the control determines that the DCT block is determined to be a portion hardly allowing a human sense to perceive an image vary and the control then moves on to step S04. On the contrary if any of high frequency components (4, 4) to (7, 7) does not exceed the predetermined threshold value then the control determines that the DCT block is determined to be a portion readily allowing a human sense to perceive an image vary and the control then moves on to step S05.

At step S04, digital watermark information is embedded in a low frequency ac component, components (0, 1) and (1, 0) in the present embodiment, at a second less significant bit. In other words, a variation range of ±2 is set.

At step S05, digital watermark information is embedded in a low frequency ac component, components (0, 1) and (1, 0) in the present embodiment, at a least significant bit. In other words, a variation range of ±1 is set.

At step S06 the control determines whether all DTC blocks have undergone steps S03–S05 and if so then the control moves on step S07.

Thus a high frequency ac component has its value determined and within a range reflecting the determination a low frequency ac component has its value changed. Thus digital watermark information is embedded. In doing so, a portion hardly allowing a human sense to perceive a pixel value variation would have a more significant bit changed to embed watermark information in a portion affecting an image, since a high frequency ac component having a larger value would result in the block of interest having an image with a change that is more significant and hence hardly perceptible through human senses, and by contrast a high frequency ac component having a smaller value would result in the block of interest being more monotonous, which would readily allow a human sense to perceive an image vary. Thus for a high frequency ac component having a large value a low frequency ac component variation range of ±2 is introduced and for a high frequency ac component having a small value a low frequency ac component variation range of ±1 is introduced.

Step S04 results in a DCT block having a low frequency ac component with the second least significant bit substituted with watermark information and step S05 results in a DTC block having a low frequency ac component with the least significant bit substituted with watermark information. Alternatively, a bit to be substituted may be a bit different from the above bits and furthermore a bit operation may be replaced by an arithmetic operation. Furthermore, while at step S04 the second least significant bit is substituted, the least significant bit (generally, each bit lower than a location having information embedded therein) may vary to have an appropriate value to minimize a variation that is introduced in a content between before and after information is embedded therein.

Furthermore in the present embodiment high frequency ac components (4, 4) to (7, 7) are subjected to the determination and low frequency ac components (0, 1) and (1, 0) have their values changed to embed watermark information. Alternatively, a component other than a high frequency ac component may be subjected to the determination and a component other than a low frequency ac component may be used for embedding information therein. Furthermore, while a low frequency ac component is subjected to the determination by using a threshold value, it may be for example by using a function.

At the subsequent step S07, inverse DCT is provided. At step S08, a new image is output. Note that if the mage is output to a file having a value in 8×8 block DCT component, such as JPEG, the step S07 inverse DCT operation is not required.

Figure 6:
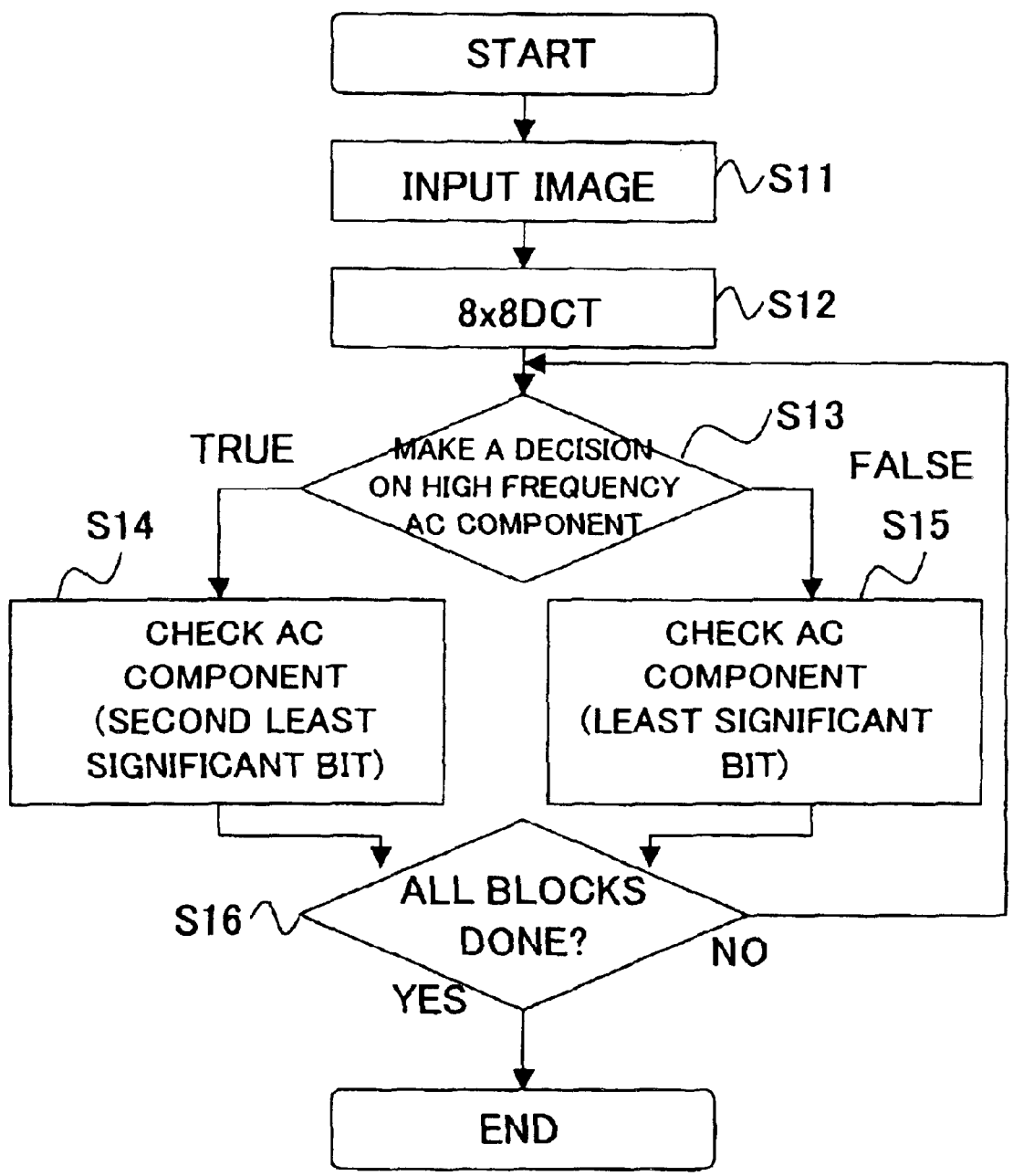
FIG. 6 is a flow chart of a process employed to detect digital watermark information from an image having the information embedded therein.

The information embedded by the digital information embedding device of the present embodiment can be detected substantially in the same procedure as it is embedded. FIG. 6 is a flow chart of a process employed to detect digital watermark information from an image having the information embedded therein. With reference to FIG. 6, an image with digital watermark information embedded therein is input (step S11). The input image is then 8×8-DCTed (step S12).

For each DCT block converted a high frequency ac component is subjected to a determination (step S13). In the determination if any of high frequency ac components (4, 4) to (7, 7) exceeds a predetermined threshold value then the control moves on to step S14 and if not then the control moves on to step S15.

At step S14 digital watermark information is detected in a low frequency ac component, components (0, 1) to (1, 0) in the present embodiment, at the second least significant bit.

At step S15 digital watermark information is detected in a low frequency ac component, components (0, 1) to (1, 0) in the present embodiment, at the least significant bit.

At step S16 the control determines whether all DCT blocks have undergone steps S13–S15 and if so then the control completes the process.

While in the present embodiment all blocks are subjected to information embedment, it is not necessary to embed information in all blocks and a portion for information embedment and that free of information embedment may be previously determined to embed information only at a specific portion.

Second Embodiment

A second embodiment of the present invention provides a digital information embedding device, as described hereinafter. In the device, input block 501 receives a digital content in the form of a still image. Feature value parsing block 502 detects the most significant bit (MSB) of a pixel value as a feature value.

If feature value parsing block 502 detects an MSB of "0" range calculation block 503 sets a variation range of ±1 and if feature value parsing block 502 detects an MSB of "1" range calculation block 503 sets a variation range of ±0.

For a pixel value with an MSB of 0, range calculation block 503 adopts the variation range of ±1 to embed information in the pixel value at the least significant bit (LSB). For a pixel value with an MSB of 1, range calculation block 503 adopts the variation range of +0 and thus does not embed information in the pixel value at the LSB.

Note that herein a pixel value having a larger value is shown whiter and a pixel value having a smaller value is shown blacker.

Figure 7:
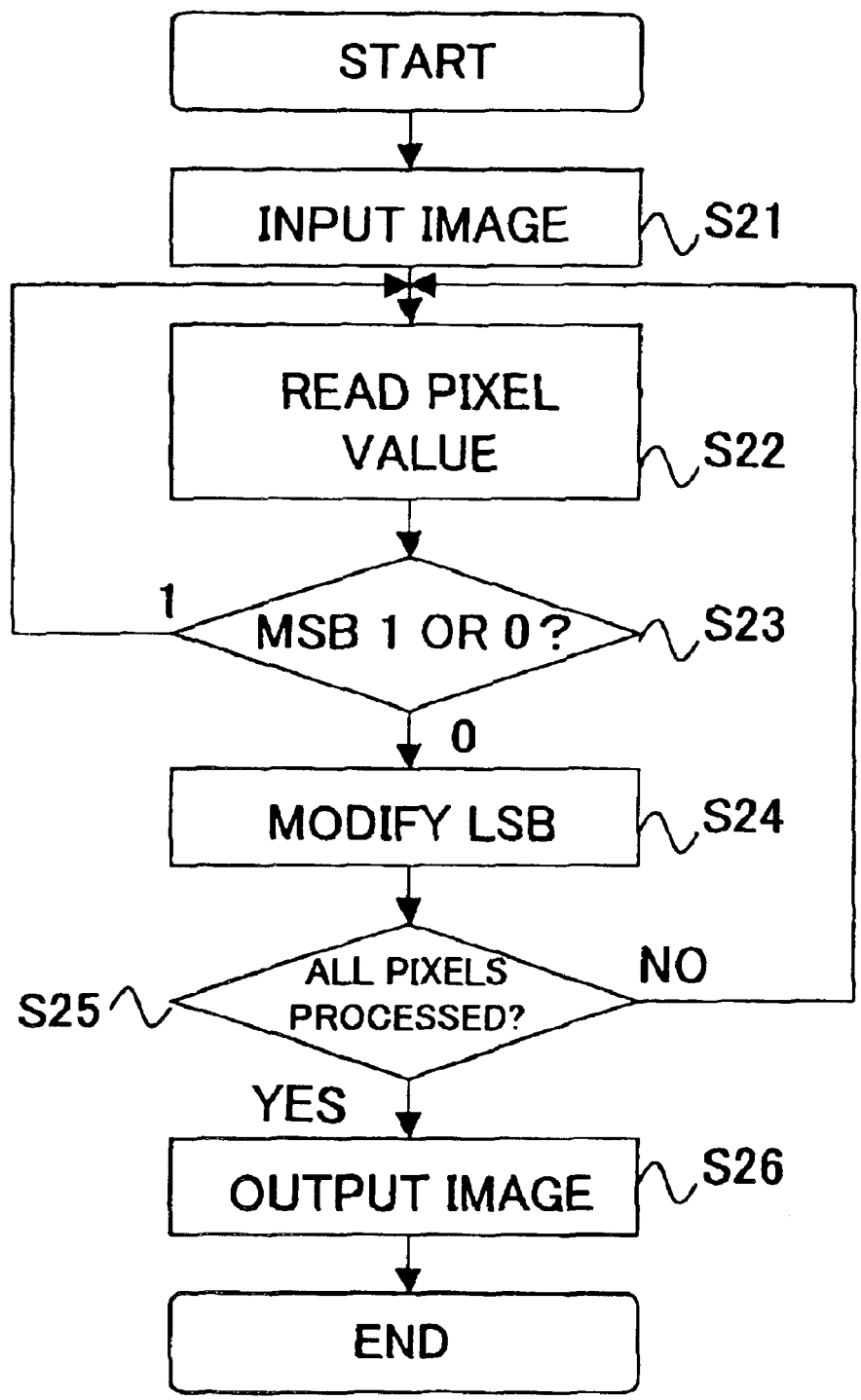
FIG. 7 is a flow chart of a digital information embedding process provided by a digital information embedding device of a second embodiment of the present invention.

FIG. 7 is a flow chart of a digital information embedding process provided by the digital information embedding device of the second embodiment. With reference to FIG. 7, an image to have watermark information embedded therein is input (step S21). Pixels' values are then successively read (step S22) and then each have its MSB subjected to a determination (step S23). If the MSB has a value of 0 then the control moves on to step S24 and if not then the control determines that the pixel is white and thus does not perform any operation and moves on to step S22 to read a subsequent pixel's value.

At step S24 the control determines that the pixel is black and the LSB is modified with watermark information to embed the watermark information.

When all pixels have been completely processed (step S25) an image is output (step S26) and the process thus ends.

Figure 8:
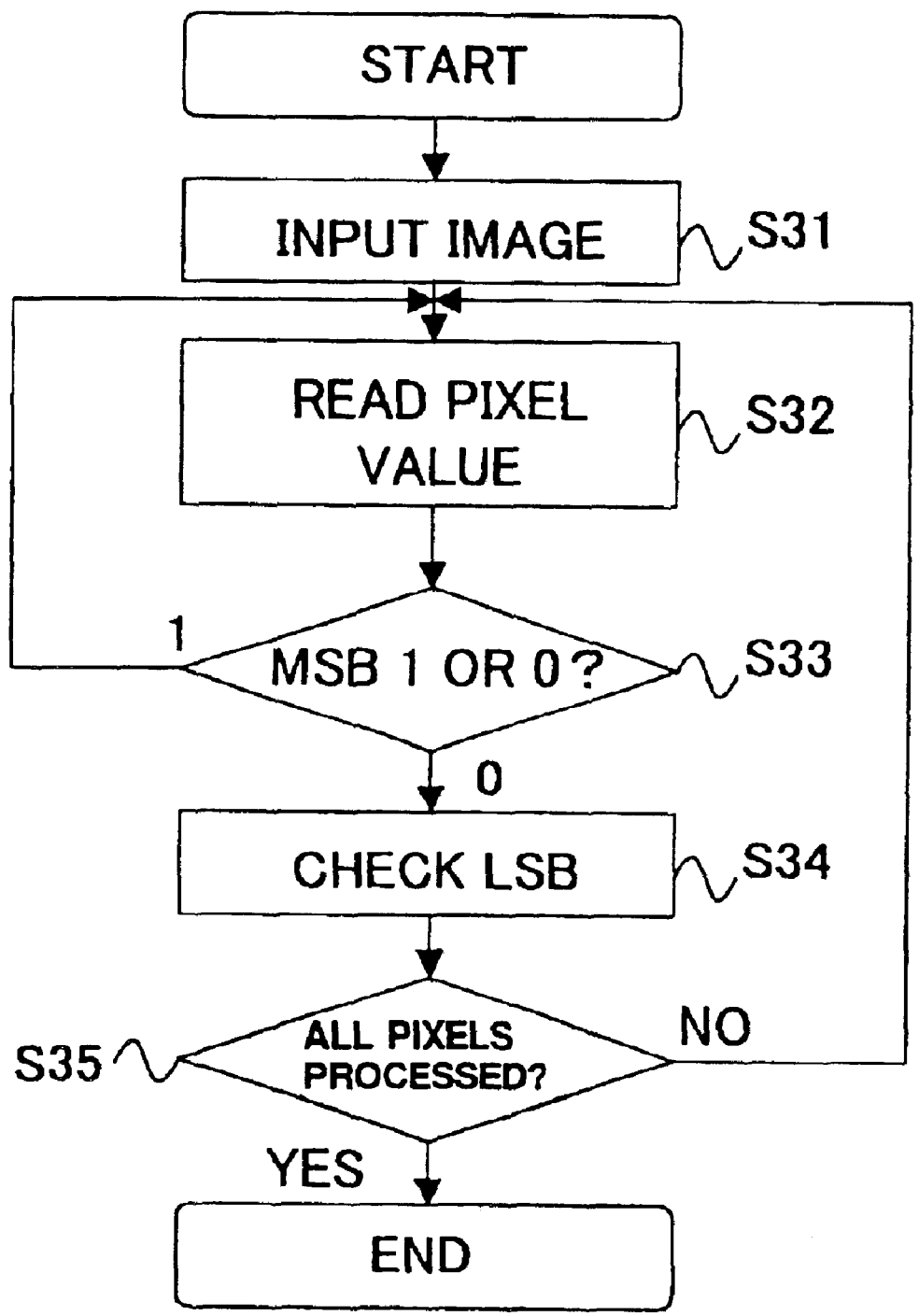
FIG. 8 is a flow chart of a process employed to detect digital information from an image having information embedded therein in the FIG. 7 digital information embedding process.
Figure 11A:
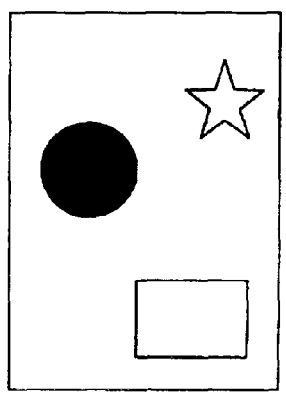
FIGS. 11A and 11B schematically show an image representing a content before it has information embedded therein, and an image representing the content after it has embedded therein information too much relative to the content, respectively.
Figure 11B:
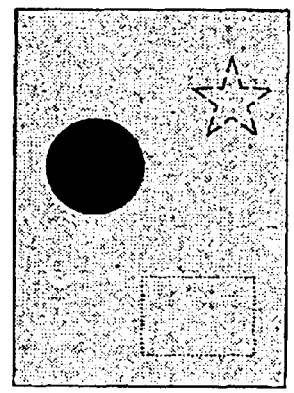

FIG. 8 is a flow chart of a process employed to detect digital information from an image having the information embedded therein in the FIG. 7 digital information embedding process. With reference to FIG. 8, an image with watermark information embedded therein is initially input (step S31). Pixels' values are then successively read (step S32) and then each have its MSB subjected to a determination (step S23). If the MSB has a value of 1 then the control moves on to step S34 and if not then the control moves on to step S22 to read a subsequent pixel's value.

At step S34 an LSB is detected to embed watermark information. When all pixels have been completely processed (YES at step S35) the detection process ends.

Note that while a value of an MSB is referred to to determine whether to embed digital information in a pixel value, a bit other than an MSB may be used to do so. Furthermore, information may be embedded at a location other than an LSB.

Since the digital information embedding device of the second embodiment uses bit decision and operation it can process data faster than not only conventional art but the digital information embedding device of the first embodiment employing DCT.

Thus the first and second embodiments can provide digital information embedding devices capable of rapidly embedding information in a digital content at a range that cannot be perceived through human senses. As such they are considered applicable for example in embedding copyright information when a content is created, and embedding user information when a content is reproduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital information embedding device, comprising:
   input device receiving a digital content input;
   a feature value detector detecting a feature value of at least a partial area of said digital content input; and
   an information embedder modifying said area, based on said feature value detected; wherein
   said information embedder includes a range determination section which determines a variation range for the pixel value, based on said feature value detected; and
   said information embedder changes a value of the pixel in said area within said variation ranged determined.

2. The digital information embedding device of claim 1, wherein:
   said input device receives an image; and
   said feature value detector detects as said feature value a value indicating a level allowing a human visual sense to perceive a pixel value vary.

3. The digital information embedding device of claim 2, wherein said information embedder changes a value of a pixel in said area only when said feature value detected is a value preventing the human visual sense from perceiving the pixel value vary.

4. The digital information embedding device of claim 2, wherein said information embedder includes a range determination section setting a larger variation range for the pixel value if said feature value detected has a higher level allowing the human visual sense to perceive the pixel value vary, and said information embedder changes a value of the pixel in said area within said variation range determined.

5. The digital information embedding device of claim 1, wherein said feature value detector includes a transform section orthogonally transforming a value of a pixel in said area to detect as said feature value at least one high frequency component of a frequency component orthogonally transformed.

6. The digital information embedding device of claim 1, wherein:
   said input device receives an image;
   said feature value detector detects as a feature value a value in brightness of a pixel included in said area; and
   said information embedder includes a range determination section setting a larger variation range for a pixel value if said value in brightness detected is smaller, and said information embedder changes a value in brightness of the pixel in said area within said variation range determined.

7. A computer-readable recording medium having recorded therein a program provided to embed digital information and causing a computer to perform the steps of:
   receiving a digital content input;
   detecting a feature value of at least a partial area of said digital content input; and
   modifying said area, based on said feature value detected, wherein the step of modifying includes the step of determining a variation range for the pixel value, based on said feature value detected, and of changing a value of the pixel in said area within said variation range determined.

8. The recording medium of claim 7, wherein:
   the step of receiving includes the step of receiving an image; and
   the step of detecting includes the step of detecting as said feature value a value indicating a level allowing a human visual sense to perceive a pixel value vary.

9. The recording medium of claim 8, wherein the step of modifying changes a value of a pixel in said area only when said feature value detected is a value preventing the human visual sense from perceiving the pixel value vary.

10. The recording medium of claim 8, wherein the step of modifying includes the step of setting a larger variation range for the pixel value if said feature value detected has a higher level allowing the human visual sense to perceive the pixel value vary, and of changing a value of the pixel in said area within said variation range determined.

11. The recording medium of claim 7, wherein the step of detecting includes the step of orthogonally transforming a value of a pixel in said area to detect as said feature value at least one high frequency component of a frequency component orthogonally transformed.

12. The recording medium of claim 7, wherein:
   the step of receiving includes the step of receiving an image;
   the step of detecting includes the step of detecting as a feature value a value in brightness of a pixel included in said area; and
   the step of modifying includes the step of setting a larger variation range for a pixel value if said value in brightness detected is smaller, and of changing a value in brightness of the pixel in said area within said variation range determined.

13. A method of embedding digital information, comprising the steps of:

receiving a digital content input;

detecting a feature value of at least a partial area of said digital content input; and modifying said area, based on said feature value detected, wherein the step of modifying includes the step of determining a variation range for the pixel value, based on said feature value detected, and of changing a value of the pixel in said area within said variation range determined.

14. The method of claim 13, wherein:

the step of receiving includes the step of receiving an image; and the step of detecting includes the step of detecting as said feature value a value indicating a level allowing a human visual sense to perceive a pixel value vary.

15. The method of claim 14, wherein the step of modifying changes a value of a pixel in said area only when said feature value detected is a value preventing the human visual sense from perceiving the pixel value vary.

16. The method of claim 14, wherein the step of modifying includes the step of setting a larger variation range for the pixel value if said feature value detected has a higher level allowing the human visual sense to perceive the pixel value vary, and of changing a value of the pixel in said area within said variation range determined.

17. The method of claim 13, wherein the step of detecting includes the step of orthogonally transforming a value of a pixel in said area to detect as said feature value at least one high frequency component of a frequency component orthogonally transformed.

18. The method of claim 13, wherein:

the step of receiving includes the step of receiving an image;

the step of detecting includes the step of detecting as a feature value a value in brightness of a pixel included in said area; and the step of modifying includes the step of setting a larger variation range for a pixel value if said value in brightness detected is smaller, and of changing a value in brightness of the pixel in said area within said variation range determined.

* * * * *